United States Patent
Ratnasamy et al.

(10) Patent No.: US 7,771,586 B2
(45) Date of Patent: Aug. 10, 2010

(54) NICKEL ON STRONTIUM-DOPED CALCIUM ALUMINATE CATALYST FOR REFORMING

(75) Inventors: Chandra Ratnasamy, Louisville, KY (US); Yeping Cai, Louisville, KY (US); William M. Faris, Louisville, KY (US); Jürgen R. Ladebeck, Louisville, KY (US)

(73) Assignee: Sud-Chemie Inc., Louisville, KY (US)

( * ) Notice: Subject to any disclaimer, the term of this patent is extended or adjusted under 35 U.S.C. 154(b) by 149 days.

(21) Appl. No.: 11/760,988

(22) Filed: Jun. 11, 2007

(65) Prior Publication Data

US 2008/0032887 A1 Feb. 7, 2008

Related U.S. Application Data

(63) Continuation-in-part of application No. 10/963,667, filed on Oct. 13, 2004, now Pat. No. 7,378,370, and a continuation-in-part of application No. 10/888,645, filed on Jul. 9, 2004.

(51) Int. Cl.
- *C10G 35/06* (2006.01)
- *B01J 23/00* (2006.01)
- *B01J 23/02* (2006.01)
- *B01J 23/06* (2006.01)
- *B01J 23/40* (2006.01)
- *B01J 23/42* (2006.01)
- *B01J 23/56* (2006.01)
- *B01J 23/58* (2006.01)
- *B01J 20/00* (2006.01)
- *B01J 21/04* (2006.01)

(52) U.S. Cl. ........................ 208/137; 502/327; 502/328; 502/332; 502/335; 502/337; 502/341; 502/355; 502/415; 502/439

(58) Field of Classification Search ................ 502/327, 502/328, 332, 335, 337, 341, 355, 415, 439; 208/137

See application file for complete search history.

(56) References Cited

U.S. PATENT DOCUMENTS

| | | | | |
|---|---|---|---|---|
| 3,391,089 A * | 7/1968 | Mayland et al. | ............. | 502/328 |
| 3,522,024 A * | 7/1970 | Billings et al. | ............ | 48/214 A |
| 3,533,963 A * | 10/1970 | Gignier et al. | .............. | 502/306 |
| 4,026,823 A * | 5/1977 | Van Hook et al. | ........... | 502/337 |
| 4,157,316 A * | 6/1979 | Thompson et al. | .......... | 502/304 |
| 4,380,589 A * | 4/1983 | Murchison et al. | .......... | 518/714 |
| 4,430,254 A * | 2/1984 | Passariello | ................... | 502/243 |
| 4,619,910 A * | 10/1986 | Dyer et al. | ................... | 502/336 |
| 4,897,177 A | 1/1990 | Nadler | | |
| 4,977,129 A * | 12/1990 | Ernest | ........................ | 502/330 |
| 4,988,661 A | 1/1991 | Arai et al. | | |
| 5,015,617 A * | 5/1991 | Ohata et al. | .................. | 502/304 |
| 5,100,859 A * | 3/1992 | Gerdes et al. | ............... | 502/439 |
| 5,145,824 A * | 9/1992 | Buffum et al. | .............. | 502/216 |
| 5,212,142 A * | 5/1993 | Dettling | ...................... | 502/304 |
| 5,492,878 A | 2/1996 | Fujii et al. | | |
| 5,773,589 A * | 6/1998 | Shoji et al. | ................... | 502/328 |
| 5,827,496 A | 10/1998 | Lyon | | |
| 5,856,263 A * | 1/1999 | Bhasin et al. | ................ | 502/333 |
| 6,436,363 B1 | 8/2002 | Hwang et al. | | |
| 6,716,791 B1 * | 4/2004 | Fuglerud et al. | ............. | 502/338 |
| 6,774,080 B2 | 8/2004 | LaBarge et al. | | |
| 6,849,572 B2 | 2/2005 | Hwang et al. | | |
| 7,071,239 B2 | 7/2006 | Ortego, Jr. et al. | | |
| 7,163,963 B2 | 1/2007 | Fraenkel | | |

* cited by examiner

*Primary Examiner*—Cam N Nguyen

(57) ABSTRACT

A strontium-doped, calcium-alumina nickel supported reforming catalyst is useful for reforming reactions when it is desired to generate a low $H_2/CO$ ratio synthesis gas and to reduce coking. The catalyst can generate a synthesis gas having a $H_2/CO$ ratio of less than about 2.3. The catalyst includes alumina, from about 0.3 wt. % to about 35 wt. % of calcium oxide, from about 0.1 wl % to about 35 wt. % of a strontium promoter, and about 0.5 wt. % to about 30 wt. % nickel. The support is prepared by a method wherein the calcium oxide is combined with the alumina to form aluminum-rich calcium aluminates.

20 Claims, No Drawings

NICKEL ON STRONTIUM-DOPED CALCIUM ALUMINATE CATALYST FOR REFORMING

CROSS-REFERENCE TO RELATED APPLICATIONS

The present application is a continuation in part application to U.S. application Ser. No. 10/888,645 filed Jul. 9, 2004, pending, and to U.S. application Ser. No. 10/963,667, filed Oct. 13, 2004, now U.S. Pat. No. 7,378,370, both of which are incorporated herein in their entirety by reference.

BACKGROUND OF THE INVENTION

1. Field of Invention

This invention relates to a highly active catalyst for use in syngas generation reactions, and more particularly to a nickel catalyst on a strontium-doped calcium-aluminate carrier. The catalyst is highly active and resistant to coking when used in producing synthesis gas, especially low $H_2/CO$ synthesis gas. A process of manufacture of the catalyst and a process of use of the catalyst are also disclosed.

2. Background Art

Production of synthesis gas or syngas (various blends of gases generally comprising hydrogen and carbon monoxide) is an important process step in the manufacture of numerous chemicals, such as ammonia and methanol. It is also useful in numerous other commercial and developmental processes, such as iron ore reduction, Fischer-Tropsch synthesis and other gas-to-liquid processes. Many of the syngas plants produce the syngas by steam reforming of light hydrocarbons, usually natural gas, and the syngas commonly has an $H_2/CO$ ratio larger than 3. Typically, these plants employ a supported nickel catalyst, usually nickel on an alpha-alumina support or nickel on a promoted-alumina support.

However, a problem that often occurs with reforming reactions is an enhanced likelihood of coking or carbon formation on the catalysts. Several solutions have been proposed to address the coking problem. For example, a large excess of $H_2O$ in the reformer feed stream can be applied in applications where $H_2$ is the target product and $CO$ is only a lower value by-product, such as in ammonium synthesis or hydrogen production. The excess of $H_2O$ generates more $H_2$ via the water-gas-shift reaction. However this solution is not suitable for applications where a low $H_2/CO$ ratio syngas is required, such as for gas-to-liquid processes.

The coking risk may be reduced by modifying the catalyst formulation. For example, U.S. Pat. No. 5,753,143 proposes the use of a noble metal catalyst. It is well known that noble metal catalysts have higher coke formation resistance than conventional steam reforming catalysts that merely utilize nickel. But, these noble metal catalysts are quite expensive, especially with the large quantity of catalysts that is conventionally utilized for this type of reaction. Alternatively, the coking problem has been addressed by the use of high dispersion of metal species over the surface of the catalyst, such as various types of double hydroxide catalysts, and U.S. Pat. No. 4,530,918 teaches a nickel on alumina catalyst with a lanthanum additive.

Conventional steam reforming nickel on alpha-alumina catalysts may include additives to enhance their performance and to reduce the coking problem. For example, alkali compounds may be added to steam reforming catalysts to reduce carbon formation but because of their potential migration during high temperature processing the alkali metals can adversely impact downstream operations. Magnesia has also been added to steam reforming catalysts to suppress carbon formation, but magnesia promoted catalysts are hard to reduce and maintain in a reduced state.

Calcium oxide as a promoter to the nickel on alumina steam reforming catalyst has been successfully used commercially. Better coking resistance and overall performance compared to the alpha-alumina catalyst has been reported. But calcium-rich calcium aluminates in a steam reforming catalyst are not desirable because they can hydrate readily and damage the integrity of the catalyst pellets. Further, as is known in the art, calcium aluminate based catalysts need to be treated to eliminate calcium-rich calcium aluminate phases, such as $12CaO.7Al_2O_3$ and $3CaO.Al_2O_3$, and the aluminum-rich phases, such as $CaO.Al_2O_3$, $CaO.2Al_2O_3$ and $CaO.6Al_2O_3$, need to be stabilized before nickel impregnation.

A higher calcination temperature can force the calcium aluminates to be transformed to the aluminum-rich phases but also cause surface sintering that is not desirable for most catalytic applications. A promoter that facilitates or stops the phase transformation process of calcium aluminates will make the catalyst more stable thermally and catalytically. A phase transfer facilitator would result in the more stable and aluminum-richer calcium aluminate phases with minimized surface sintering while a phase transfer stopper would stabilize the calcium aluminates at aluminum-leaner phases.

Thus, there is a need for more active, more coking-resistant, and more stable catalysts for syngas generation, especially for the processes that directly produce syngas with $H_2/CO$ ratio less than 2.3.

SUMMARY OF THE INVENTION

The invention is a calcium promoted, alumina supported, nickel catalyst stabilized with strontium which is present at the surface of the calcium-aluminate support. The catalyst is intended for use in syngas generation processes, and especially for the processes producing low $H_2/CO$ ratio syngas, such as when the $H_2/CO$ ratio less than 2.3. The catalyst comprises up to about 98 wt % alumina, from about 0.5 wt % to about 30 wt % nickel, from about 0.3 wt % to about 35 wt % calcium oxide, and from about 0.1 wt % to about 35 wt % strontium, wherein the calcium oxide is combined with the alumina to form a calcium aluminate.

The invention further comprises a process for the production of a strontium-stabilized calcium-promoted, alumina-supported nickel reforming catalyst for use in syngas generation processes, and especially for the processes producing low $H_2/CO$ ratio syngas, such as when the $H_2/CO$ ratio less than 2.3. The catalyst production process comprises combining an aluminum compound with a calcium oxide additive to form a carrier precursor mixture, forming the mixture into a desirable shape, preferably pellets containing one or multiple holes, treating the formed mixture with steam, calcining the steamed, formed product at a temperature from about 250° C. to about 1700° C. to form the catalyst precursor, impregnating the calcium aluminate carrier precursor with strontium and calcining at a temperature from about 900° C. to about 1700° C. to form a strontium-doped carrier, then impregnating the strontium-doped calcium aluminate carrier with a nickel salt solution, and drying and calcining the impregnated material to form the strontium-doped, calcium-promoted, alumina-supported nickel catalyst. Additional stabilizers may be added, without limitation, with the calcium oxide, or after heat treatments, or at the time of nickel addition.

DETAILED DESCRIPTION OF THE INVENTION

The present invention is a highly active, coke resistant catalyst especially useful in processes producing low $H_2/CO$ ratio synthesis gas, such as when the $H_2/CO$ ratio is less than 2.3. The catalyst is a calcium oxide promoted, alumina supported, nickel catalyst that is stabilized with strontium. Specifically, the catalyst is prepared such that the calcium oxide and alumina are combined to form a carrier precursor having an exterior surface, and then strontium and nickel are added to the carrier precursor so as to remain on the surface of the calcium-aluminate carrier. When the calcium oxide promoted, alumina supported, nickel catalyst that is stabilized with strontium is prepared in this manner, the catalyst demonstrates considerably higher syngas generation activity than catalysts which do not include strontium or than catalysts which have strontium incorporated within the alumina support.

The carrier precursor or support for the catalyst of the invention is prepared by combining a calcium compound and an aluminum compound. An exemplary composition of the carrier precursor comprises from about 0.3 wt % to about 35 wt % and more preferably from about 2 wt % to about 16 wt % calcium. Combined with the calcium compound is an aluminum compound to balance, wherein an exemplary composition comprises alpha-alumina or calcium aluminates. The calcium compound used as the source of calcium includes but is not limited to calcium carbonate, calcium oxide, any forms of calcium aluminates, calcium nitrate, and calcium hydroxides, preferably calcium carbonate, calcium oxide, calcium hydroxides, and calcium aluminates. The aluminum compound used as the source of aluminum includes but is not limited to aluminum oxide, aluminum hydroxide, aluminum nitrate, any forms of calcium aluminates, and any organic forms of aluminum, preferably aluminum oxide and aluminum hydroxide.

The carrier precursor material is formed such that the calcium compound is combined with the aluminum compound to form various calcium and aluminum combinations, such as hibonite ($CaO.6Al_2O_3$) and other calcium aluminates, such as $CaO.2Al_2O_3$ and $CaO.Al_2O_3$. Any stable calcium aluminate can be utilized. However, preferably, no free calcium oxide is detectable in the carrier precursor by x-ray diffraction after the formation of the catalyst.

The carrier precursor is formed by conventional procedures. Appropriate quantities of solid alumina and/or aluminum hydroxide are mixed with calcium aluminate cement, calcium oxide and/or calcium hydroxide. The mixture is then blended with graphite and water to form granules. The granules are then formed into any desirable shape, such as tablets, using a tabletting machine. An exemplary shape, without limitation, for the tablets is cylindrical with at least one hole. As is known in the art multiple holes, such as, for example, five to ten holes, may extend through each tablet. The formed tablets are then dried at a temperature of about 250° C. to about 1700° C. for from about 6 hours to about 36 hours to remove moisture and to develop ceramic bonds to form the calcium aluminates. The resulting calcium-promoted alumina carrier has a BET surface area of at least about 2 $m^2$/gram and a pore volume, measured by mercury penetration, of at least about 0.25 cc/gram. As with any solid material, the carrier precursor has an exposed surface that for the purposes of the invention will be referred to as the "exterior surface".

After the calcium aluminate carrier precursor material is formed, strontium is added to the carrier precursor via impregnation. The strontium-impregnated carrier precursor is then calcined at a temperature from about 900° C. to about 1700° C. to form the catalyst support. The addition of strontium to the carrier precursor via impregnation is not intended to be limiting. Rather the strontium may be added to the carrier precursor by any means that is known in the art that will deliver the strontium to the exterior surface of the carrier precursor with a relatively even distribution. The strontium source may be strontium nitrate or strontium acetate or any strontium source that will deliver Sr(II) to the catalyst. Preferably, the strontium source will not generate poisonous counterions, such as chlorides and others known in the catalyst art. The strontium may be added at concentrations ranging from 0.1 wt % to about 35 wt %. More typically, the strontium will be added to deliver from about 1 wt % to about 5 wt % strontium in the finished catalyst, and more preferably from about 1.5 wt % to about 3.0 wt %.

After the strontium-impregnated support is prepared, nickel is added to the support via impregnation and the nickel-impregnated support is calcined at about 500° C. to form the finished catalyst. The addition of nickel to the support via impregnation is not intended to be limiting. Rather, the nickel may be added to the support by any means that is known in the art that will deliver the nickel to the surface of the support with a relatively even distribution and without causing loss of the strontium. The nickel source may be any appropriate nickel salt solution, such as, without limitation, nickel nitrate or nickel acetate. The nickel concentration may range from about 0.5 wt % to about 30 wt %, more typically from about 5 wt % to about 20 wt %, and more preferably from about 10 wt % to about 15 wt %.

The resulting catalyst has a substantially larger surface area and greater pore volume than conventional nickel on alumina catalysts (which typically have a BET surface area in the range of 1 $m^2$/g to 4 $m^2$/g and a pore volume from about 0.08 to 0.16 cc/g). The BET surface area of the calcium-promoted strontium-stabilized nickel alumina catalyst is at least about 10 $m^2$/g, and preferably from about 15 $m^2$/g to about 30 $m^2$/g. The pore volume of the calcium-promoted strontium-stabilized nickel alumina catalyst is greater than about 0.25 cc/g, and is preferably greater than about 0.27 cc/g. The calcium promotion also permits a better nickel dispersion on the catalyst body (as determined by using $H_2$ chemisorption for nickel specific surface area).

The catalyst of the invention is especially useful for syngas generation reactions where the product has a $H_2$/CO ratio of less than 2.3. The general term syngas generation reactions used in this invention includes partial oxidation, steam reforming, $CO_2$-reforming, autothermal reforming and any modified reactions that apply steam, oxygen, carbon dioxide, or any combinations thereof to reform light hydrocarbons, usually natural gas, to generate syngas.

In order to illustrate the present invention and advantages thereof, the following examples are provided. It is understood that these examples are for purpose of illustration and are not intended to create any limitations on the invention. The physical characteristics for the catalysts are presented in Tables 1 and 2.

Example 1

A catalyst carrier is prepared by blending 100 kg alumina powder with 400 kg water in a mixer to make a slurry. The slurry is spray dried at a temperature of 120° C. to 370° C. About 1 kg aluminum stearate powder is then added to the mixture and the mixture is tabletted and calcined at 1400° C.-1600° C. for about 5 hours to form the catalyst carrier. The only phase of the carrier detected by XRD is alpha-alumina. The carrier is then impregnated with sufficient nickel nitrate to yield a nickel loading, after calcination, of 14.8 wt %.

Example 2

A catalyst carrier precursor is prepared by blending about 36.29 kg of aluminum hydroxide and 11.24 kg of calcium aluminate cement with 6.2 kg distilled water and 2.7 kg graphite. The mixture is then tabletted, autoclaved at 20-100 psig for about 10 hours, and calcined for about 8 hours at 120° C.-400° C. followed by calcining for about 5 hours at 1250° C.-1350° C. The carrier precursor is determined to contain 5.7 wt % calcium oxide with the balance being alumina. The carrier precursor is then analyzed under x-ray diffraction and discovered to be comprised of major phases of alpha-alumina, hibonite ($CaO \cdot 6Al_2O_3$), and calcium bialuminate ($CaO \cdot 2Al_2O_3$). Very small calcium monoaluminate ($CaO \cdot Al_2O_3$) peaks are also present as detected by XRD. However, there is no detectable free calcium oxide or calcium aluminates that contain aluminum leaner than calcium monoaluminate ($CaO \cdot Al_2O_3$). The carrier precursor has a BET surface area of 2.5 m²/g and a pore volume (measured by mercury penetration method) of 0.45 cc/g. The carrier precursor is then impregnated with a nickel nitrate solution containing about 15 wt % nickel. The impregnated carrier precursor is then calcined for about 2 hours at 400° C.-600° C. After calcination, the impregnation and calcination procedures are repeated twice for a total of three impregnations and three calcinations. The finished catalyst contains 13.3 wt % nickel.

Example 3

A catalyst carrier precursor is prepared as in Example 2 through the first calcination of 120° C.-400° C. The calcined carrier precursor is then impregnated with a strontium nitrate solution to deliver 1.5 wt % strontium to the finished catalyst. The strontium-doped calcium aluminate carrier precursor is calcined at about 1300° C. The strontium-doped calcium aluminate carrier precursor is then impregnated with a nickel nitrate solution to deliver 11.9 wt % nickel to the finished catalyst. The nickel impregnated catalyst is calcined at 550° C. The finished catalyst contains 1.5 wt % strontium and 11.9 wt % nickel.

Example 4

A catalyst is prepared as disclosed in Example 3 except the strontium and nickel are added to produce a finished product containing 2.4 wt % strontium and 11.9 wt % nickel.

Example 5

A catalyst is prepared as disclosed in Example 3 except the strontium and nickel are added to produce a finished product containing 3.8 wt % strontium and 11.5 wt % nickel.

Example 6

A catalyst is prepared as disclosed in Example 3 except the strontium is added in the form of strontium acetate, and the strontium and nickel are added to produce a finished product containing 1.7 wt % strontium and 11.5 wt % nickel.

Example 7

A catalyst is prepared as disclosed in Example 6 except the strontium and nickel are added to produce a finished product containing 2.6 wt % strontium and 11.7 wt % nickel.

Example 8

A strontium-doped catalyst carrier precursor is prepared by blending about 36 kg of aluminum hydroxide and about 11 kg of calcium aluminate cement and about 5.8 kg of strontium nitrate with 6.2 kg distilled water and 2.7 kg graphite. The mixture is then tabletted, and dried for about 8 hours at 120° C.-400° C., and then calcined at 1300° C. The carrier precursor is then analyzed under x-ray diffraction and no free calcium oxide is detected. The strontium-doped calcium aluminate carrier precursor is then impregnated with a nickel nitrate solution to deliver 11.5 wt % nickel to the finished catalyst. The nickel impregnated catalyst is calcined at 550° C. The finished catalyst contains 2.4 wt % strontium and 11.5 wt % nickel.

TABLE 1

| Sample | Sr Source | PV (cc/g) | SA (m²/g) | In Precursor Ca Conc. | In Precursor Additives | In Finished Catalyst Sr Conc. | In Finished Catalyst Ni Conc. |
|---|---|---|---|---|---|---|---|
| 1 | none | 0.12 | 3.3 | not added | not added | not added | 14.8 wt % |
| 2 | none | 0.28 | 8.0 | 5.7 wt % | not added | not added | 13.3 wt % |
| 3 | nitrate | 0.30 | 22.0 | 5.7 wt % | not added | 1.5 wt % | 11.9 wt % |
| 4 | nitrate | 0.30 | 23.7 | 5.7 wt % | not added | 2.4 wt % | 11.9 wt % |
| 5 | nitrate | 0.29 | 15.8 | 5.7 wt % | not added | 3.8 wt % | 11.5 wt % |
| 6 | acetate | 0.27 | 22.8 | 5.7 wt % | not added | 1.7 wt % | 11.5 wt % |
| 7 | acetate | 0.27 | 20.1 | 5.7 wt % | not added | 2.6 wt % | 11.7 wt % |
| 8 | nitrate | 0.30 | 24.7 | 5.7 wt % | 2.4 wt % Sr | (in prec.) | 11.5 wt % |

TABLE 2

| Sample | Pore Volume Distribution <1000 Å | 1000 Å-5000 Å | >5000 Å |
|---|---|---|---|
| 1 | 3.9% | 74.4% | 21.7% |
| 2 | 15.8% | 47.3% | 36.9% |
| 3 | 18.1% | 44.1% | 37.8% |
| 4 | 18.5% | 42.0% | 39.5% |
| 5 | 14.7% | 46.0% | 39.3% |
| 6 | 9.5% | 52.0% | 38.5% |
| 7 | 11.1% | 50.8% | 38.1% |
| 8 | 46.8% | 31.6% | 21.6% |

Testing Procedures

The catalyst activity is tested in a tubular reactor system. The catalyst particles, having a typical size of about 8×12 mesh, are placed in a catalyst bed to test their performance in steam reforming of methane at 5 psig. The catalyst is first reduced and then tested for approximately six hours at a gas hourly space velocity (GHSV) of about 25,000/h with the catalyst bed gas temperature held at about 800° F. The feed stream for steam reforming consists of about 25% $CH_4$ and 75% $H_2O$ (expressed in terms of mole basis) with an $H_2O/CH_4$ ratio of about 3. Activity is expressed in terms of Arrhenius activity (Kw at 800° F.). The catalyst is tested for four consecutive days, with approximately sixteen hour "rest" periods between each run. During the rest period, the catalyst bed is maintained at a temperature of about 1600° F. under a steam (>95%) plus nitrogen (<5%) blanket. The catalyst bed is then reduced with hydrogen following a rest period prior to the introduction of methane. Arrhenius activity for the catalysts of Examples 2-8 is summarized in Table 3.

TABLE 3

| Sample | In Finished Catalyst | | | Arrhenius Activity (Kw at 800° F.) | | | |
|---|---|---|---|---|---|---|---|
| | Sr Conc. | Source | Ni Conc. | Day 1 | Day 2 | Day 3 | Day 4 |
| 1 | not added | none | 14.8 wt % | na | na | na | na |
| 2 | not added | none | 13.3 wt % | 4497 | 2592 | 1586 | — |
| 3 | 1.5 wt % | nitrate | 11.9 wt % | 5824 | 2684 | 1559 | 1323 |
| 4 | 2.4 wt % | nitrate | 11.9 wt % | 5644 | 3467 | 2183 | 1701 |
| 5 | 3.8 wt % | nitrate | 11.5 wt % | 5093 | 3164 | 2424 | 1769 |
| 6 | 1.7 wt % | acetate | 11.5 wt % | 5842 | 3324 | 1922 | 1571 |
| 7 | 2.6 wt % | acetate | 11.7 wt % | 5843 | 2854 | 1841 | 1483 |
| 8 | 2.4 wt %[A] | nitrate | 11.5 wt % | 3484 | 592 | 375 | 198 |

[A]Strontium nitrate added with calcium oxide and alumina during preparation of carrier precursor. It is assumed that because of this particular order of addition and method of addition, the strontium has been incorporated within the calcium-aluminate support. This differs from the present invention which adds the strontium so as to distribute the strontium on the surface of the calcium-aluminate support, not to incorporate it within the support.

As demonstrated by the Arrhenius activity, the addition of strontium to a nickel on calcium-aluminate catalyst significantly improves the catalyst activity, particularly with respect to stabilizing the catalyst when the catalyst is exposed to multiple reforming/rest cycles. Moreover, as shown by comparing the performance of the catalyst of Example 8 to the catalyst of Example 4, when strontium is disbursed on the exterior surface of the calcium-aluminate carrier the catalyst demonstrates a significant improvement in activity and stabilization of the catalyst versus having the strontium to be incorporated within the calcium-aluminate carrier as in prior art catalysts.

The catalyst of the present invention may also be used for steam and carbon dioxide mixed reforming. In this case, an exemplary feed stream may consist of about 19% CO, 18% $CH_4$, 14%, $CO_2$, 13% $H_2O$, 35% $H_2$ (all mole basis) and 2 parts per million $H_2S$. The $H_2O/CH_4$ ratio is 0.74 and the $CO_2/CH_4$ ratio is 0.79. Further, the catalyst may be used for autothermal reforming with a representative feed stream consisting of steam, air, and methane, a representative GHSV of 500,000/h, and with an $H_2O/CH_4$ ratio of about 0.6 and an $O_2/CH_4$ ratio of about 0.57. Carbon formation resistance may be tested in a pressurized reactor at 350 psig (24.1 bars) as carbon formation is more pronounced at elevated pressures. The test temperature is from about 1000° F. to about 1500° F. N-hexane is used as the feed for the hydrocarbon. The experiments are carried out starting at an $H_2O/C$ ratio of 6.0 and the ratio is gradually decreased until carbon formation is detected. For either the feed stream containing sulfur or the ones having essentially no sulfur, the catalyst of the present invention has an improved activity index and higher resistance to carbon formation than a conventional nickel on alumina catalyst. Further, the promoted catalysts of the present invention demonstrate activity for a longer period of time than the conventional nickel on alpha-alumina catalyst or the nickel on calcium aluminate catalyst.

It is understood that variations may be made which would fall within the scope of this development. For example, although the catalysts of the present invention are intended for use as reforming catalysts for use in syngas producing processes where low $H_2/CO$ ratio synthesis gas, such as $H_2/CO$ ratio less than 2.3 is generated directly, it is anticipated that these catalysts could be used in other applications where a higher $H_2/CO$ ratio syngas are produced. The scope of the present invention can only be limited by the appended claims.

The invention claimed is:

1. A reforming catalyst for use in a syngas producing process that generates a low $H_2/CO$ ratio synthesis gas, the catalyst comprising:
a precursor comprising about 0.3 wt. % to about 35 wt. % of a calcium compound, about 1 wt. % to about 35 wt. % of a strontium compound, and up to about 98 wt. % of an aluminum compound that together have been calcined to form a calcined, strontium-doped, calcium-aluminate precursor; and
about 0.5 wt. % to about 30 wt. % of a nickel compound on the calcined, strontium-doped, calcium aluminate precursor, wherein the weight percentages are based on the total weight of the reforming catalyst.

2. The catalyst of claim 1 wherein the calcium compound comprises from about 2 wt. % to about 20 wt. % of the catalyst.

3. The catalyst of claim 2 wherein the nickel compound comprises from about 10 wt. % to about 15 wt. % of the catalyst.

4. The catalyst of claim 3 wherein the strontium compound comprises from about 1.0 wt. % to about 5.0 wt. % of the catalyst.

5. The catalyst of claim 3 wherein the strontium compound comprises from about 1.5 wt. % to about 3.0 wt. % of the catalyst.

6. The catalyst of claim 1 wherein the nickel compound comprises from about 5 wt. % to about 20 wt. % of the catalyst.

7. The catalyst of claim 1 wherein the catalyst produces a synthesis gas having a $H_2/CO$ ratio less than about 2.3.

8. The catalyst of claim 1 wherein the strontium compound comprises from about 1.5 wt. % to about 3.0 wt. % of the catalyst.

9. The catalyst of claim 1 wherein the strontium compound is selected from the group consisting of strontium nitrate, strontium acetate and a combination thereof.

10. The catalyst of claim 1 wherein the nickel compound is selected from the group consisting of nickel nitrate, nickel acetate and a combination thereof.

11. The catalyst of claim 1 further being highly resistant to carbon/coke formation.

12. The catalyst of claim 1 further having a BET surface area of at least about 10 $m^2/g$.

13. The catalyst of claim 1 further having a pore volume greater than about 0.2 cc/g.

14. A method of making the reforming catalyst of claim 1 comprising:
(a) blending the aluminum compound with the calcium compound to form an aluminum/calcium mixture;
(b) forming the aluminum/calcium mixture into a predetermined shape to form a calcium-aluminate carrier precursor;
(c) calcining the calcium-aluminate carrier precursor to form a calcined, calcium-aluminate carrier precursor;

(d) impregnating the calcined, calcium-aluminate carrier precursor with the strontium compound to form a calcined, strontium-doped, calcium-aluminate precursor;

(e) impregnating the calcined, strontium-doped, calcium-aluminate precursor with the nickel compound to form a calcined, strontium-doped, nickel-impregnated, calcium-aluminate precursor; and (f) calcining the calcined, strontium-doped, nickel-impregnated, calcium-aluminate precursor to make the reforming catalyst.

15. The method of claim 14 wherein the calcining of the calcium-aluminate carrier precursor in step (c) is performed at about 120° C. to about 1700° C.

16. The method of claim 14 further including calcining the calcined, strontium-doped, calcium-aluminate precursor of step (d) at about 900° C. to about 1700° C. prior to the nickel-impregnating step (e).

17. The method of claim 14 wherein the calcining of the calcined, strontium-doped, nickel-impregnated, calcium-aluminate precursor in step (f) is performed at about 500° C.

18. A method of reforming light hydrocarbons comprising contacting the catalyst of claim 1 with a feed stream containing a mixture of steam, carbon dioxide and the light hydrocarbon.

19. A method of autothermal reforming light hydrocarbons comprising contacting the catalyst of claim 1 with a feed stream containing a mixture of steam, air and the light hydrocarbon.

20. A reforming catalyst for use in a syngas producing process that generates a low $H_2/CO$ ratio synthesis gas, the catalyst comprising a precursor comprising about 0.3 wt. % to about 35 wt. % of a calcium compound, about 0.5 wt. % to about 35 wt. % of a strontium compound, and up to about 98 wt. % of an aluminum compound that have been calcined to form a calcined, strontium-doped, calcium-aluminate precursor; and about 0.5 wt. % to about 30 wt. % of a nickel compound on the calcined, strontium-doped, calcium aluminate precursor, wherein the weight percentages are based on the total weight of the reforming catalyst.

* * * * *